(12) United States Patent
Matsumaru

(10) Patent No.: US 8,172,657 B2
(45) Date of Patent: May 8, 2012

(54) GAME MACHINE, GAME MACHINE CONTROL METHOD, AND INFORMATION STORAGE MEDIUM

(75) Inventor: Hajime Matsumaru, Minato-ku (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 599 days.

(21) Appl. No.: 12/438,495

(22) PCT Filed: Jul. 9, 2007

(86) PCT No.: PCT/JP2007/063653
§ 371 (c)(1),
(2), (4) Date: Feb. 23, 2009

(87) PCT Pub. No.: WO2008/026382
PCT Pub. Date: Mar. 6, 2008

(65) Prior Publication Data
US 2010/0248804 A1    Sep. 30, 2010

(30) Foreign Application Priority Data

Aug. 29, 2006   (JP) .................................. 2006-232643

(51) Int. Cl.
*A63F 13/00*    (2006.01)
(52) U.S. Cl. ......... 463/4; 463/7; 463/9; 463/31; 463/32; 463/37
(58) Field of Classification Search .................. None
See application file for complete search history.

(56) References Cited

U.S. PATENT DOCUMENTS

| 6,676,518 | B1 | 1/2004 | Sawa | |
|---|---|---|---|---|
| 8,070,607 | B2* | 12/2011 | Takahashi et al. | 463/42 |
| 2007/0232375 | A1* | 10/2007 | Izumi et al. | 463/7 |
| 2008/0194325 | A1* | 8/2008 | Komuta | 463/31 |
| 2009/0054138 | A1* | 2/2009 | Uchiyama et al. | 463/31 |

FOREIGN PATENT DOCUMENTS

| JP | 07-178246 A | 7/1995 |
|---|---|---|
| JP | 2001-070643 A | 3/2001 |
| JP | 3421746 B2 | 4/2003 |
| JP | 2004-329875 A | 11/2004 |
| JP | 2005050070 A | 2/2005 |
| JP | 2005131310 A | 5/2005 |
| TW | 527201 | 4/2003 |
| TW | I235678 | 7/2005 |

OTHER PUBLICATIONS

Taiwanese Search Report corresponding to Taiwanese Patent Application No. 096125167, dated May 27, 2010.

(Continued)

*Primary Examiner* — David E Graybill
(74) *Attorney, Agent, or Firm* — Sughrue Mion, PLLC

(57) ABSTRACT

Provided is a game machine capable of desirably demonstrating an "extent of field-of-view" of a player in a sports game. A field-of-view area setting unit (64) sets, based on a location and orientation of an operational target player character, a field-of-view area of the operational target player character. A pass-partner-search-area setting area (74) sets a pass-partner search area, based on the location of the operational target player character and a direction specified by a pass-direction instructing operation. In the case where a pass-execution instructing operation is received, a pass-execution control unit (68) determines whether a moving object character is moved in a direction determined based on a location of a teammate player character selected from among teammate player characters located within the pass-partner search area, or in a direction specified by the pass-direction instructing operation, based on a judgment result as to whether or not one or more teammate player characters are located within the field-of-view area of the operational target player character.

3 Claims, 10 Drawing Sheets

OTHER PUBLICATIONS

Konami Co., Ltd., "Konami Official Guide Perfect Series Jikkyo World Soccer 2001 Perfect Guide, first edition," Dec. 15, 2001, p. 25.

Konami Co., Ltd., "Konami Official Guide Perfect Series Jikkyo J. League 1999 Perfect Striker Perfect Guide, first edition," Jan. 12, 2000, p. 12.

Konami Co., Ltd., "Konami Kanpeki Koryaku Series (5) J. League Jikkyo Winning Eleven '97 Koshiki Kanzen Guidebook, 2nd Edition," Jul. 5, 1997, p. 11.

Futabasha Publishers Ltd., "Sega Saturn Kanpeki Koryaku Series (7) J. League Victory Goal '96 Hissho Koryakuho, 2nd edition," Apr. 15, 1997, p. 13.

* cited by examiner

FIG.5
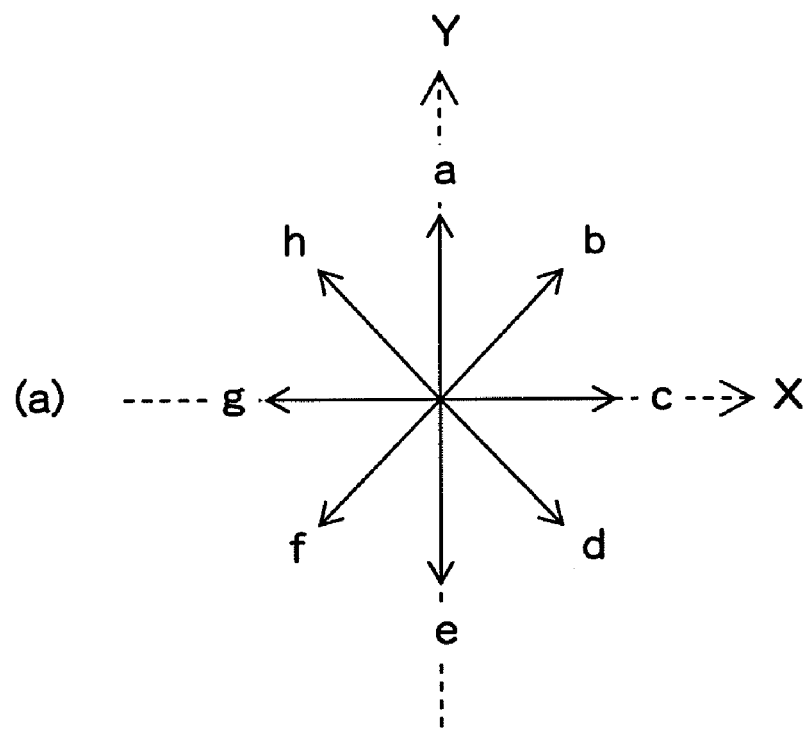
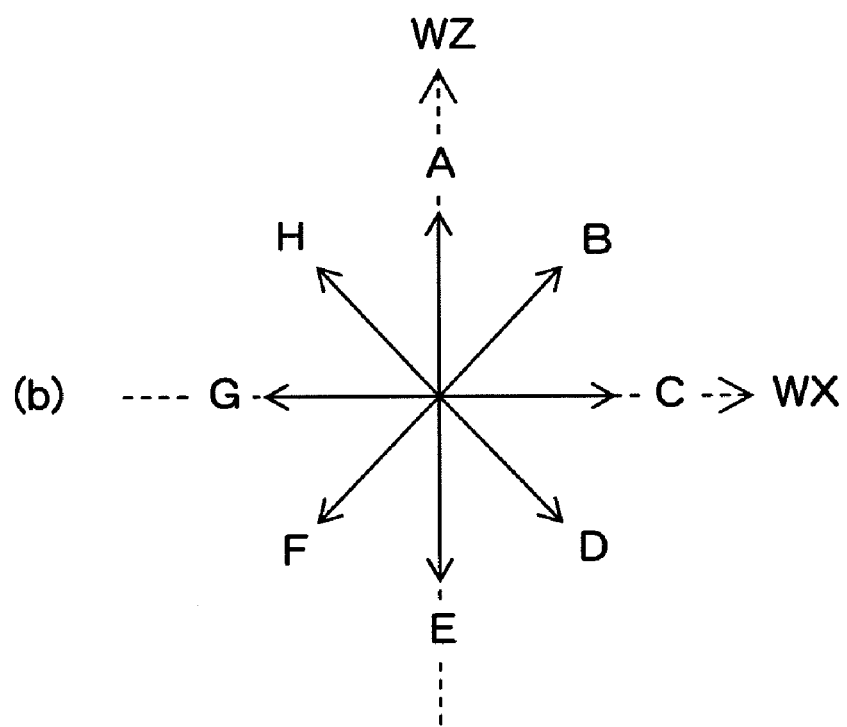

| PLAYER OBJECT ID | FIELD-OF-VIEW AREA FLAG | REMAINING TIME COUNTER |
|---|---|---|
| 1 | 0 | 0 |
| 2 | 0 | 0 |
| 3 | 0 | 0 |
| 4 | 0 | 0 |
| 5 | 0 | 120 |
| 6 | 0 | 50 |
| 8 | 0 | 75 |
| 9 | 1 | 0 |
| 10 | 1 | 0 |
| 11 | 1 | 0 |

GAME MACHINE, GAME MACHINE CONTROL METHOD, AND INFORMATION STORAGE MEDIUM

TECHNICAL FIELD

The present invention relates to a game machine, a control method for a game machine, and an information storage medium.

BACKGROUND ART

There has been growing popularity in sports games played between a player's operational target team and an opponent team by using a moving object such as a ball or a puck. For example, such sports games include a soccer game, a basketball game, and an ice hockey game.
Patent Document 1: JP 3421746 B

DISCLOSURE OF THE INVENTION

Problem to be Solved by the Invention

In real sports matches, a player who recognizes locations, movements etc. of their teammate players over a relatively wide area and, for example, delivers an excellent pass to their teammate player, is sometimes referred to as a "player with good vision". If it becomes possible to desirably demonstrate an "extent of field-of-view" of a player character in such sports games as described above, the reality of those games can be enhanced, thereby making those games more entertaining.

The present invention has been made in view of the above-mentioned problem, and has an object to provide a game machine, a control method for a game machine, and an information storage medium capable of desirably demonstrating the "extent of field-of-view" of a player in a sports game.

Means for Solving the Problem

In order to solve the above-mentioned problem, according to the present invention, a game machine, which displays a situation of a game space in which an operational target player character, one or more teammate player characters, and a moving object character representing a moving object are located, and which provides a sports game played using the moving object between an operational target team, to which the operational target player character and the one or more teammate player characters belong, and an opponent team, includes: field-of-view area setting means for setting, based on a location and orientation of the operational target player character, a field-of-view area of the operational target player character; field-of-view area judging means for judging whether or not one or more teammate player characters are located within the field-of-view area of the operational target player character; pass-instructing-operation receiving means for receiving a pass-execution instructing operation that gives an instruction to execute a pass and a pass-direction instructing operation that specifies a pass direction in the game space; pass-partner-search-area setting means for setting, based on the location of the operational target player character and a direction specified by the pass-direction instructing operation, a pass-partner search area; pass-partner selecting means for selecting any one of the teammate player characters located within the pass-partner search area as a pass partner; first pass executing means for moving the moving object character in a direction determined based on a location of the teammate player character selected by the pass-partner selecting means; second pass executing means for moving the moving object character in a direction specified by the pass-direction instructing operation; and pass-execution control means for causing, in the case where the pass-execution instructing operation is received, any one of the first pass executing means and the second pass executing means to perform movement control of the moving object character, the pass-execution control means selecting the any one of the first pass executing means and the second pass executing means based on a judgment result from the field-of-view area judging means.

Further, according to the present invention, a control method for a game machine which displays a situation of a game space in which an operational target player character, one or more teammate player characters, and a moving object character representing a moving object are located, and which provides a sports game played using the moving object between an operational target team, to which the operational target player character and the one or more teammate player characters belong, and an opponent team, includes: a field-of-view area setting step of setting, based on a location and orientation of the operational target player character, a field-of-view area of the operational target player character; a field-of-view area judging step of judging whether or not one or more teammate player characters are located within the field-of-view area of the operational target player character; a pass-instructing-operation receiving step of receiving a pass-execution instructing operation that gives an instruction to execute a pass and a pass-direction instructing operation that specifies a pass direction in the game space; a pass-partner-search-area setting step of setting, based on the location of the operational target player character and a direction specified by the pass-direction instructing operation, a pass-partner search area; a pass-partner selecting step of selecting any one of the teammate player characters located within the pass-partner search area as a pass partner; a first pass executing step of moving the moving object character in a direction determined based on a location of the teammate player character selected in the pass-partner selecting step; a second pass executing step of moving the moving object character in a direction specified by the pass-direction instructing operation; and a pass-execution control step of performing, in the case where the pass-execution instructing operation is received, movement control of the moving object character in any one of the first pass executing step and the second pass executing step, the pass-execution control step including selecting the any one of the first pass executing step and the second pass executing step based on a judgment result in the field-of-view area judging step.

Further, a program according to the present invention causes a computer such as a personal computer, a home-use game machine, a portable game machine, an arcade game machine, a cellular phone, or a personal digital assistant (PDA) to function as a game machine which displays a situation of a game space in which an operational target player character, one or more teammate player characters, and a moving object character representing a moving object are located, and which provides a sports game played using the moving object between an operational target team, to which the operational target player character and the one or more teammate player characters belong, and an opponent team. The program further causes the computer to function as: field-of-view area setting means for setting, based on a location and orientation of the operational target player character, a field-of-view area of the operational target player character; field-of-view area judging means for judging whether or not one or more teammate player characters are located within the field-of-view area of the operational target player character; pass-instructing-operation receiving means for receiving a pass-execution instructing operation that gives an instruction to execute a pass and a pass-direction instructing operation that specifies a pass direction in the game space; pass-partner-search-area setting means for setting, based on the location of the operational target player character and a direction specified by the pass-direction instructing operation, a pass-partner search area; pass-partner selecting means for selecting any one of the teammate player characters located within the pass-partner search area as a pass partner; first pass executing means for moving the moving object character in a direction determined based on a location of the teammate player character selected by the pass-partner selecting means; second pass executing means for moving the moving object character in a direction specified by the pass-direction instructing operation; and pass-execution control means for causing, in the case where the pass-execution instructing operation is received, any one of the first pass executing means and the second pass executing means to perform movement control of the moving object character, the pass-execution control means selecting the any one of the first pass executing means and the second pass executing means based on a judgment result from the field-of-view area judging means.

Further, a computer-readable information storage medium according to the present invention is recorded with the above-mentioned program. Still further, a program distribution device according to the present invention is provided with the information storage medium recorded with the above-mentioned program, which reads the above-mentioned program from the information storage medium and distributes the read program. Still further, a program distribution method according to the present invention includes reading the above-mentioned program from the information storage medium recorded with the above-mentioned program and distributing the read program.

The present invention relates to the game machine which displays the situation of the game space in which the operational target player character, the one or more teammate player characters, and the moving object character representing the moving object are located, and which provides the sports game played using the moving object between the operational target team, to which the operational target player character and the one or more teammate player characters belong, and the opponent team. According to the present invention, the field-of-view area of the operational target player character is set based on the location and orientation of the operational target player character. Further, according to the present invention, the pass-execution instructing operation that gives the instruction to execute a pass and the pass-direction instructing operation that specifies the pass direction in the game space are received. Based on the location of the operational target player character and the direction specified by the pass-direction instructing operation, the pass-partner search area is set. Any one of the teammate player characters located within the pass-partner search area is selected as the pass partner. When the pass-execution instructing operation is received, it is determined whether the moving object character is moved in the direction determined based on the location of the selected teammate player character or the moving object character is moved in the direction specified by the pass-direction instructing operation, based on the judgment result as to whether or not one or more teammate characters are located within the field-of-view area of the operational target player character. It should be noted that examples of the "game space" include a three-dimensional game space that is made up of three coordinate elements, and a two-dimensional game space that is made up of two coordinate elements. Further, operations with respect to a single operation portion may function both as the "pass-execution instructing operation" and as the "pass-direction instructing operation". According to the present invention, it is possible to desirably demonstrate the "extent of field-of-view" of a player in a sports game.

Further, according to one aspect of the present invention, the pass-execution control means may select the any one of the first pass executing means and the second pass executing means, based on a result of the judgment made by the field-of-view area judging means during a period from a predetermined time before to a current time.

BRIEF DESCRIPTION OF THE DRAWINGS

FIG. 5 are diagrams for explaining correspondence relations between tilt directions of a left operation stick and directions in the virtual three-dimensional space.

BEST MODE FOR CARRYING OUT THE INVENTION

Hereinafter, an example of an embodiment of the present invention will be described in detail with reference to the drawings.

Figure 1:
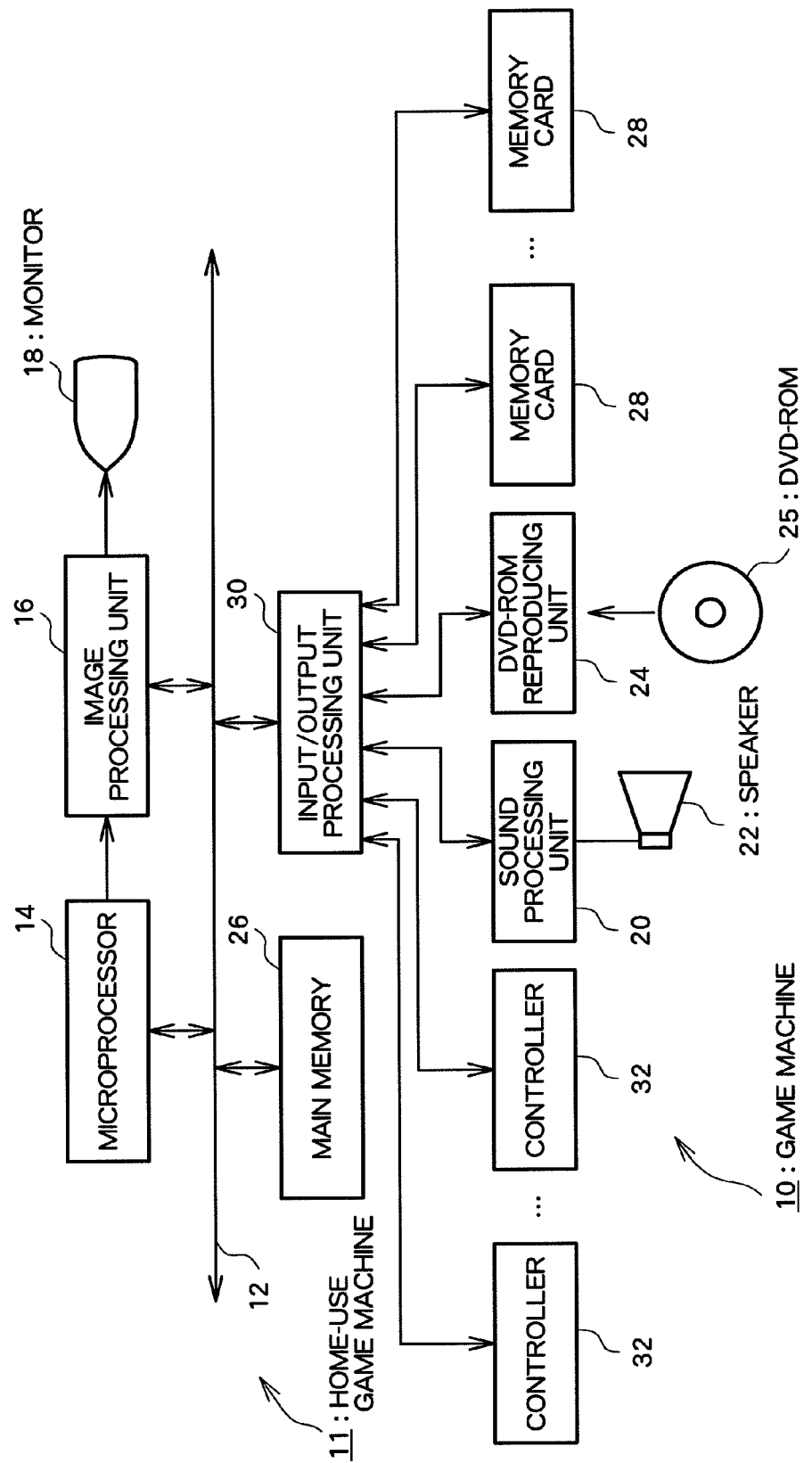
FIG. 1 is a diagram illustrating an overall configuration of a game machine according to an embodiment of the present invention.

FIG. 1 is a diagram illustrating an overall configuration of a game machine according to the embodiment of the present invention. A game machine 10 illustrated in FIG. 1 is configured by inserting a DVD-ROM 25 and a memory card 28, which serve as information storage media, into a home-use game machine 11, and also connecting a monitor 18 and a speaker 22 to the home-use game machine 11. For example, a home-use TV set is used for the monitor 18, and a built-in speaker thereof is used for the speaker 22.

The home-use game machine 11 is a well-known computer game system including a bus 12, a microprocessor 14, an image processing unit 16, a sound processing unit 20, a DVD-ROM reproducing unit 24, a main memory 26, an input/output processing unit 30, and a controller 32. The configurational components other than the controller 32 are accommodated in an enclosure.

The bus 12 is for exchanging addresses and data among the units of the home-use game machine 11. The microprocessor 14, the image processing unit 16, the main memory 26, and the input/output processing unit 30 are connected via the bus 12 so as to exchange data with one another.

The microprocessor 14 controls the individual units of the home-use game machine 11 based on an operating system stored in a ROM (not shown), a program read from the DVD-ROM 25, and data read from the memory card 28. The main memory 26 includes, for example, a RAM, and the program read from the DVD-ROM 25 and the data read from the memory card 28 are written in the main memory 26 if necessary. The main memory 26 is also used for operations of the microprocessor 14.

The image processing unit 16 includes a VRAM and renders a game screen on the VRAM based on image data sent from the microprocessor 14. Then, the image processing unit 16 converts a content thereof into video signals and outputs the video signals to the monitor 18 at predetermined timings.

The input/output processing unit 30 is an interface used for the microprocessor 14 to access the sound processing unit 20, the DVD-ROM reproducing unit 24, the memory card 28, and the controller 32. The sound processing unit 20, the DVD-ROM reproducing unit 24, the memory card 28, and the controller 32 are connected to the input/output processing unit 30.

The sound processing unit 20, which includes a sound buffer, reproduces and outputs, from the speaker 22, various categories of sound data such as game music, game sound effects, and messages that are read from the DVD-ROM 25 and stored in the sound buffer.

The DVD-ROM reproducing unit 24 reads the program recorded on the DVD-ROM 25 in accordance with an instruction given from the microprocessor 14. It should be noted that in this case, the DVD-ROM 25 is employed for supplying the program to the home-use game machine 11, but any other information storage media such as CD-ROMs and ROM cards may also be used. Further, the program may also be supplied to the home-use game machine 11 from a remote location via a communication network such as the Internet.

The memory card 28 includes a nonvolatile memory (e.g., EEPROM). The home-use game machine 11 is provided with a plurality of memory card slots into which the memory cards 28 are inserted, and a plurality of the memory cards 28 can be simultaneously inserted into the game machine. A memory card 28 is so constructed as to be inserted into and removed from a memory card slot, and is employed for storing various types of game data such as save data.

The controller 32 is a general-purpose operation input means used for a user to input a variety of game operations. The input/output processing unit 30 scans the state of each portion of the controller 32 at fixed intervals (e.g., every 1/60 seconds), and transfers operation signals representing the scanned results to the microprocessor 14 via the bus 12. The microprocessor 14 determines the game operation of the user based on those operation signals. The home-use game machine 11 is configured to be connectable with a plurality of the controllers 32, and the microprocessor 14 performs game control based on the operation signals that are input from the respective controllers 32.

Figure 2:
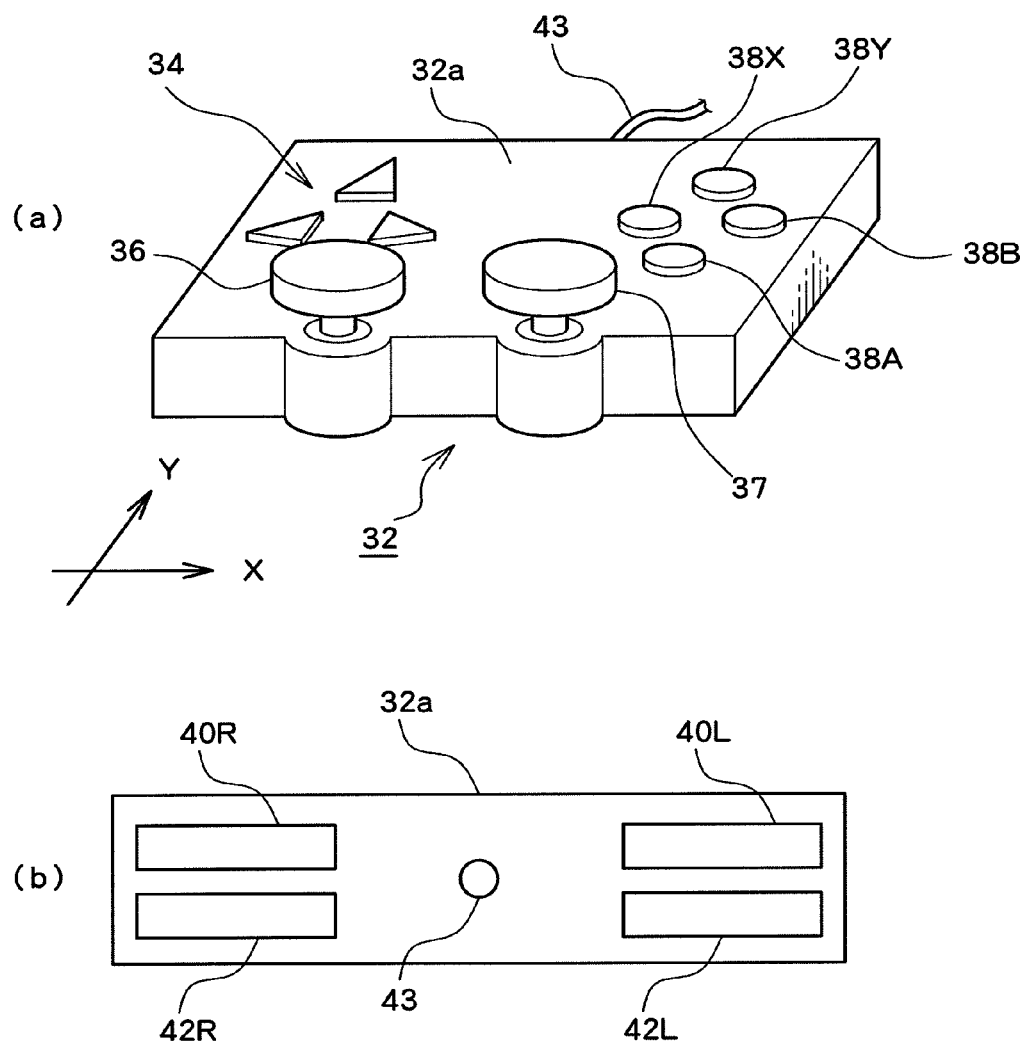
FIG. 2 are diagrams illustrating an example of a controller.

FIG. 2 are diagrams illustrating an example of the controller 32. FIG. 2(a) is a perspective view of the controller 32. FIG. 2(b) is a rear view of the controller 32. The controller 32 is connected to the home-use game machine 11 via a controller cable 43. The left half of a top surface 32a of the controller 32 is provided with a direction button group 34 and a left operation stick 36. The right half of the top surface 32a of the controller 32 is provided with buttons 38X, 38Y, 38A, and 38B and a right operation stick 37. In addition, the rear side of the controller 32 is provided with buttons 40L and 40R on the left and right of the top surface 32a side, respectively, and is also provided with buttons 42L and 42R on the left and right of the bottom surface side, respectively.

The direction button group 34 is used for a direction instructing operation, e.g., an operation for specifying a moving direction of a game character. The buttons 38X, 38Y, 38A, 38B, 40L, 40R, 42L, and 42R are used for various types of game operations. The left operation stick 36 and the right operation stick 37 are stick-like operation members that stand upright on the top surface 32a of the controller 32 and, from the upright state, can be tilted freely in all directions by a predetermined angle. The left operation stick 36 and the right operation stick 37 are used for the direction instructing operation as well.

As illustrated in FIG. 2(a), it is assumed that the longer direction of the casing of the controller 32 is an X-axis direction (rightward direction is a positive direction in FIG. 2(a)) and that the depth direction of the casing perpendicular to the X-axis is a Y-axis direction (direction from near side to far side is a positive direction in FIG. 2(a)). Digital values ranging from −127 to +127 are input to the home-use game machine 11 as data (attitude data (X,Y)) indicating the tilts in the X-axis direction and the Y-axis direction of the left operation stick 36. Specifically, when X=0, it is indicated that the left operation stick 36 is not tilted in the X-axis direction. Further, when X=+127, it is indicated that the left operation stick 36 is tilted in the positive direction of the X-axis to the maximum extent. Still further, when X=−127, it is indicated that the left operation stick 36 is tilted in the negative direction of the X-axis to the maximum extent. The same applies to the Y-axis direction. Further, the same holds for the right operation stick 37 as in the case of the left operation stick 36. In this manner, the home-use game machine 11 obtains current tilt states (attitudes) of the left operation stick 36 and the right operation stick 37.

With the above-mentioned game machine 10, by executing a game program read from, for example, the DVD-ROM 25, a soccer game played between a user's operational target team and an opponent team is implemented.

Figure 3:
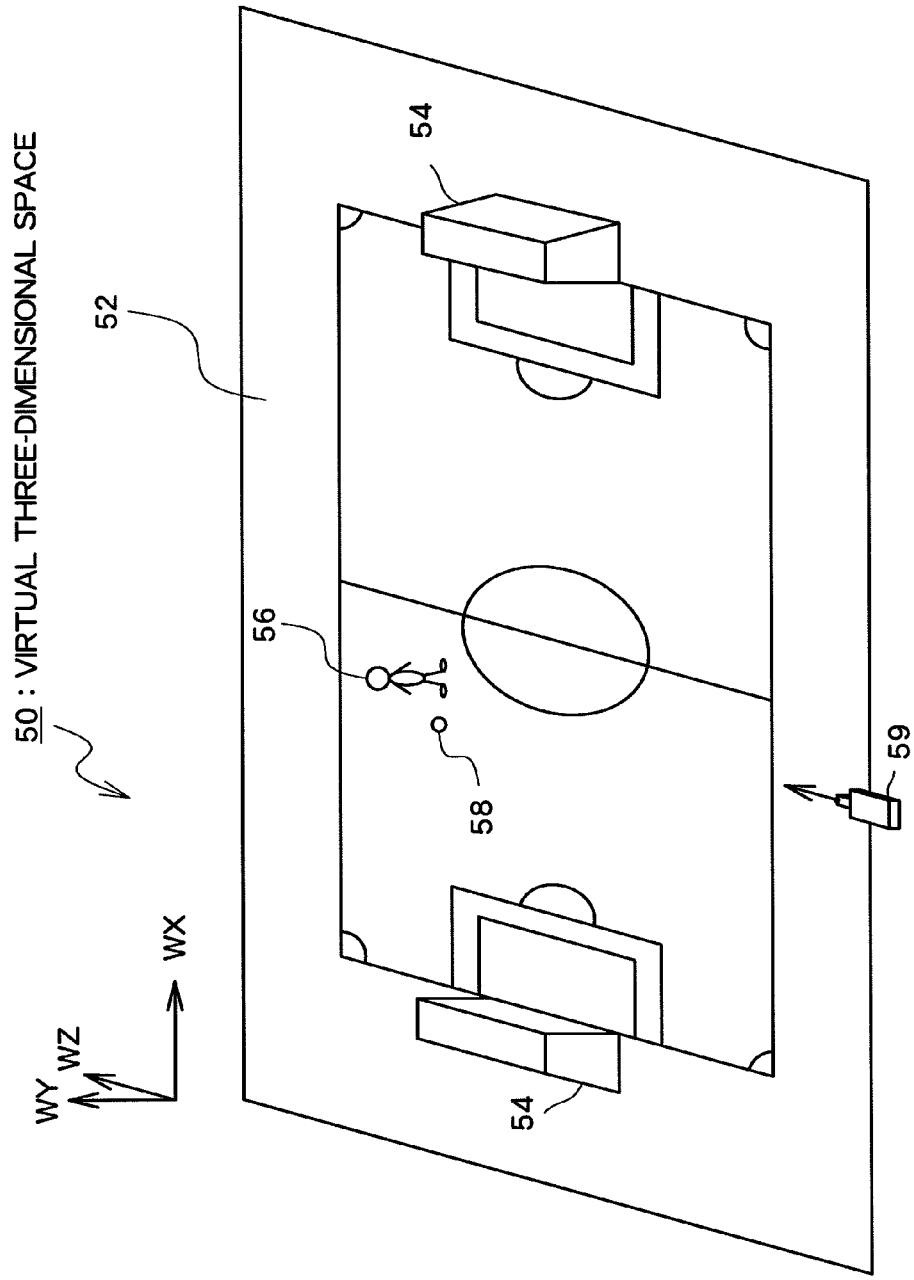
FIG. 3 is a diagram illustrating an example of a virtual three-dimensional space.

In order to implement the above-mentioned soccer game, a virtual three-dimensional space (game space) is created in the main memory 26. FIG. 3 is a diagram illustrating an example of the virtual three-dimensional space. As illustrated in FIG. 3, a field object 52 representing a field and goal objects 54 representing goals are located in a virtual three-dimensional space 50. On the field object 52, a player object 56 (player character) representing a soccer player and a ball object 58 (moving object character) representing a soccer ball (moving object) are located. In FIG. 3, only one player object 56 is displayed, but eleven player objects 56 belonging to the operational target team and another eleven player objects 56 belonging to the opponent team are located on the field object 52.

Any one of the player objects 56 belonging to the operational target team is set as an operational target of the user. The operational target of the user can be switched among the player objects 56 belonging to the operational target team in response to a movement of the ball object 58 or a switching operation (e.g., depressing operation of button 40L) of the user. The player object 56 (hereinafter, referred to as "operational target player object") of the user's operational target performs a variety of actions in response to the operation with respect to the controller 32.

The player objects 56 other than the operational target player object among the player objects 56 belonging to the operational target team (hereinafter, referred to as "teammate player objects") and the player objects 56 belonging to the opponent team (hereinafter, referred to as "opponent player objects") perform actions according to the operation by the computer.

When a distance between the player object 56 and the ball object 58 becomes within a predetermined reference distance, the player object 56 and the ball object 58 are associated with each other under a predetermined condition. In this state, the ball object 58 moves in accordance with the movement of the player object 56. This situation is displayed as a dribbling action of the player object 56. In a state where the operational target player object and the ball object 58 are associated with each other, the user can cause the operational target player object to kick the ball object 58 through operation of the controller 32. For example, by depressing the button 38A, the user can cause the operational target player object to perform a pass action. It should be noted that herein, the state in which the player object 56 and the ball object 58 are associated with each other is referred to as a "state in which the player object 56 is keeping the ball object 58". Further, the state in which the player object 56 is keeping the ball object 58 is referred to as a "ball-keeping state".

In the virtual three-dimensional space 50, a virtual camera 59 (viewpoint and view direction) is set. The virtual camera 59 moves along the positive or negative direction of a WX-axis in response to the movement of the ball object 58. A game screen showing a situation of the virtual three-dimensional space 50 viewed from the virtual camera 59 is displayed on the monitor 18. The user gives instructions on actions of the operational target player object through operation of the controller 32 while seeing the game screen, and attempts to move the ball object 58 into the goal object 54 of the opponent team (to generate a scoring event).

Hereinafter, technology for desirably demonstrating an "extent of field-of-view" of a player will be described.

Figure 4:
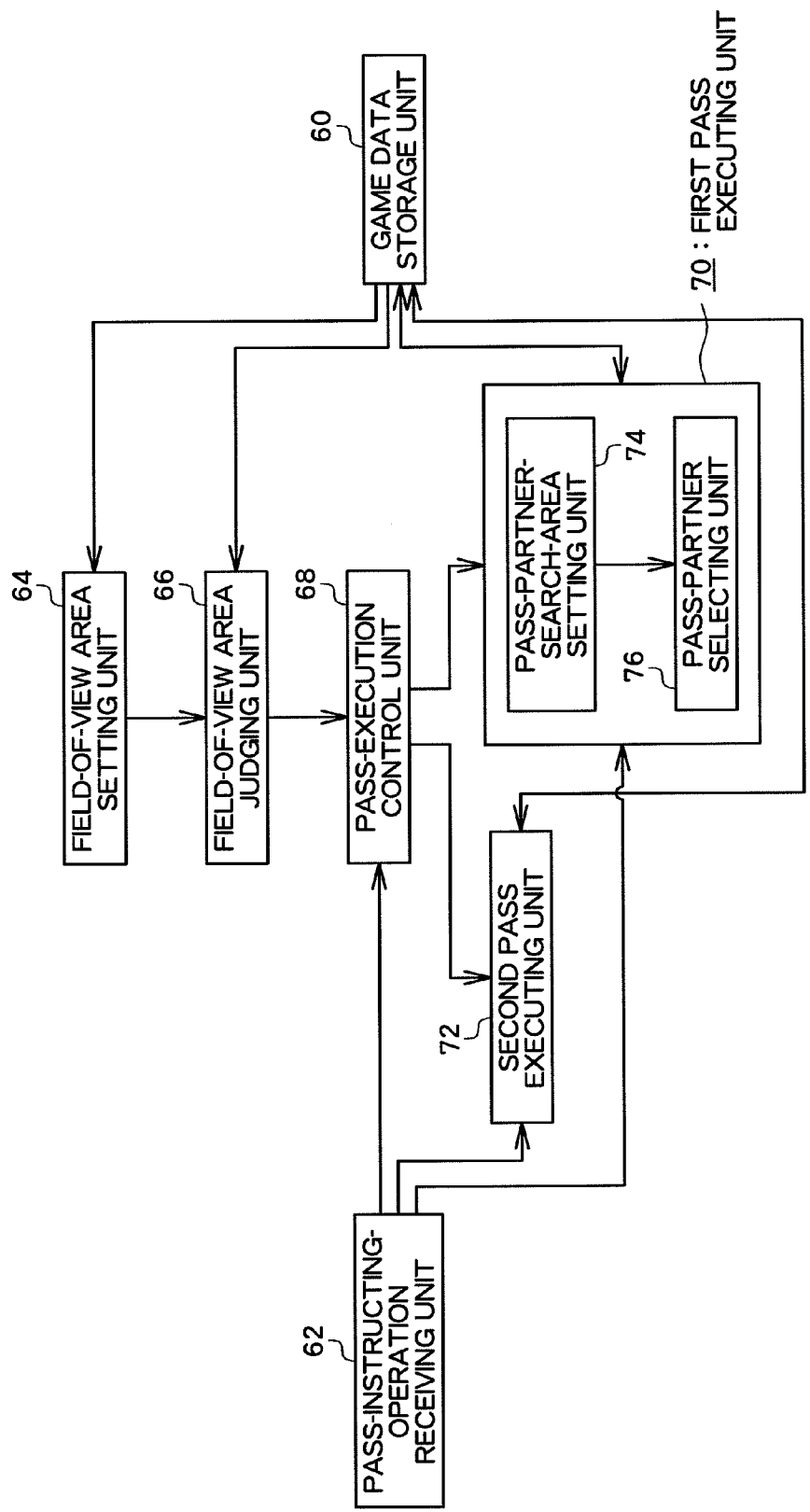
FIG. 4 is a functional block diagram of the game machine according to the embodiment of the present invention.

First, functions implemented on the game machine 10 will be described. FIG. 4 is a functional block diagram mainly illustrating functions relating to the present invention among the functions implemented on the game machine 10. As illustrated in FIG. 4, the game machine 10 includes a game data storage unit 60, a pass-instructing-operation receiving unit 62, a field-of-view area setting unit 64, a field-of-view area judging unit 66, a pass-execution control unit 68, a first pass executing unit 70, and a second pass executing unit 72. Those functions are implemented by executing the game program read from the DVD-ROM 25 on the game machine 10.

[Game Data Storage Unit]

The game data storage unit 60 is implemented mainly by the main memory 26 or the DVD-ROM 25. Game situation information indicating a situation of a game is stored in the game data storage unit 60. The game situation information includes such information as the states of the individual player objects 56 and the ball object 58 located in the virtual three-dimensional space 50, and the state of the virtual camera 59.

The information indicating the state of the player object 56 includes such information as a location, attitude (orientation), moving direction, moving speed, and the like of the player object in the virtual three-dimensional space 50. Further, the information indicating the state of the player object 56 also includes such information as whether or not the player object 56 is in the ball-keeping state and whether or not the player object 56 is the operational target player object.

The information indicating the state of the ball object 58 includes such information as a location, moving direction, and moving speed of the ball object 58 in the virtual three-dimensional space 50. Further, the information indicating the state of the virtual camera 59 includes such information as a location (viewpoint location), attitude (view direction), angle of view, and the like of the virtual camera 59 in the virtual three-dimensional space 50.

Further, ability parameters of the individual player objects 56 located in the virtual three-dimensional space 50 are stored in the game data storage unit 60. The ability parameters include, for example, a field-of-view parameter indicating the extent of field-of-view of the player object 56. Each ability parameter is represented by numerical values ranging from 0 to 100, and a larger numerical value represents a higher ability.

[Pass-Instructing-Operation Receiving Unit]

The pass-instructing-operation receiving unit 62 is implemented mainly by the microprocessor 14. The pass-instructing-operation receiving unit 62 receives a pass-execution instructing operation that gives an instruction to execute a pass and a pass-direction instructing operation that specifies a pass direction in the virtual three-dimensional space 50. In the case of the embodiment of the present invention, the pass-execution instructing operation is a depressing operation of the button 38A, and the pass-direction instructing operation is a tilting operation of the left operation stick 36. The pass-instructing-operation receiving unit 62 judges whether or not the button 38A has been depressed based on operation signals input from the controller 32. Further, the pass-instructing-operation receiving unit 62 judges the direction of tilt of the left operation stick 36 based on the operation signals input from the controller 32. Specifically, the pass-instructing-operation receiving unit 62 judges the pass direction specified by the pass-direction instructing operation. It should be noted that the pass-direction instructing operation may be set as an operation of the direction button group 34.

According to the embodiment of the present invention, the positive direction of the X-axis illustrated in FIG. 2(*a*) corresponds to the positive direction of the WX-axis in the virtual three-dimensional space 50, whereas the negative direction of the X-axis corresponds to the negative direction of the WX-axis in the virtual three-dimensional space 50. Further, the positive direction of the Y-axis illustrated in FIG. 2(*a*) corresponds to the positive direction of the WZ-axis in the virtual three-dimensional space 50, whereas the negative direction of the Y-axis corresponds to the negative direction of the WZ-axis in the virtual three-dimensional space 50. FIG. 5 are diagrams for describing correspondence relations between tilt directions of the left operation stick 36 and directions in the virtual three-dimensional space 50.

FIG. 5(*a*) illustrates representative tilt directions of the left operation stick 36. It should be noted that the X-axis and Y-axis directions illustrated in FIG. 5(*a*) correspond to the X-axis and Y-axis directions illustrated in FIG. 2(*a*). A direction a in FIG. 5(*a*) is the positive direction of the Y-axis. A direction b is a direction obtained by 45° rotation (clockwise) from the positive direction of the Y-axis toward the positive direction of the X-axis. A direction c is the positive direction of the X-axis. A direction d is a direction obtained by 45° rotation (clockwise) from the positive direction of the X-axis toward the negative direction of the Y-axis. A direction e is the negative direction of the Y-axis. A direction f is a direction obtained by 45° rotation (clockwise) from the negative direction of the Y-axis toward the negative direction of the X-axis.

A direction g is the negative direction of the X-axis. A direction h is a direction obtained by 45° rotation (clockwise) from the negative direction of the X-axis toward the positive direction of the Y-axis.

FIG. 5(b) illustrates representative directions in the virtual three-dimensional space 50. It should be noted that the WZ-axis and WX-axis directions illustrated in FIG. 5(b) correspond to the WZ-axis and WX-axis directions illustrated in FIG. 3. A direction A in FIG. 5(b) is the positive direction of the WZ-axis. A direction B is a direction obtained by 45° rotation (clockwise) from the positive direction of the WZ-axis toward the positive direction of the WX-axis. A direction C is the positive direction of the WX-axis. A direction D is a direction obtained by 45° rotation (clockwise) from the positive direction of the WX-axis toward the negative direction of the WZ-axis. A direction E is the negative direction of the WZ-axis. A direction F is a direction obtained by 45° rotation (clockwise) from the negative direction of the WZ-axis toward the negative direction of the WX-axis. A direction G is the negative direction of the WX-axis. A direction H is a direction obtained by 45° rotation (clockwise) from the negative direction of the WX-axis toward the positive direction of the WZ-axis.

The directions a to h of FIG. 5(a) correspond to the directions A to H of FIG. 5(b), respectively. Therefore, for example, when the left operation stick 36 is tilted in the direction a, this means that the direction A in the virtual three-dimensional space 50 is specified as the pass direction. Further, for example, when the left operation stick 36 is tilted in the direction b, this means that the direction B in the virtual three-dimensional space 50 is specified as the pass direction.

[Field-of-View Area Setting Unit]

The field-of-view area setting unit 64 is implemented mainly by the microprocessor 14. The field-of-view area setting unit 64 sets a field-of-view area of the operational target player object based on the location and orientation of the operational target player object.

Figure 6:
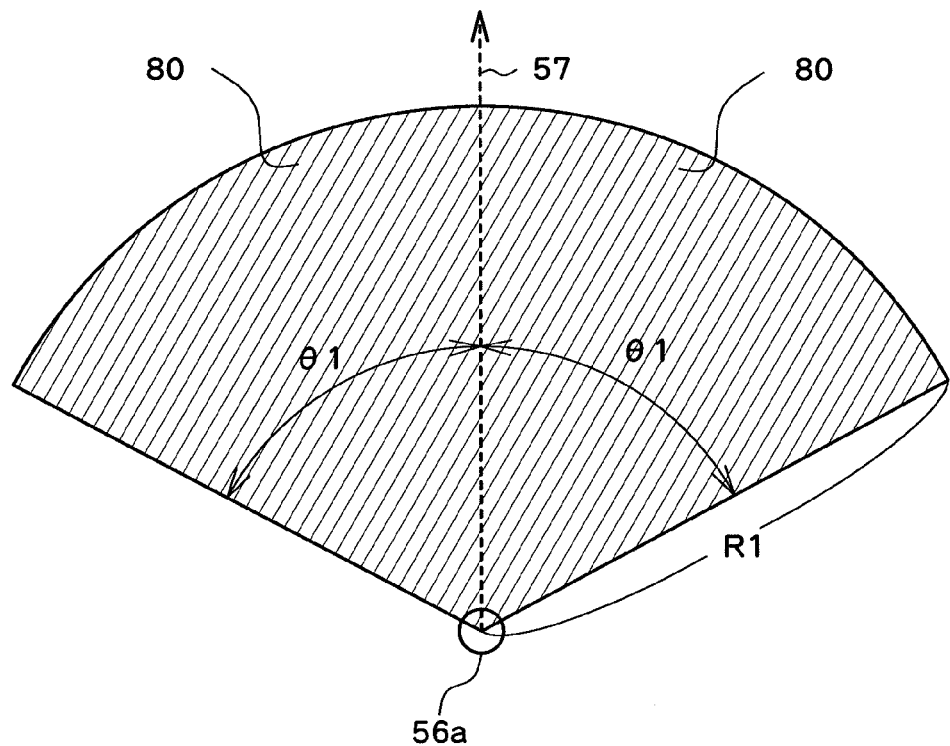
FIG. 6 is diagram illustrating an example of a field-of-view area.

FIG. 6 is a diagram for describing the field-of-view area of the operational target player object. As illustrated in FIG. 6, a field-of-view area 80 of the operational target player object is an area covering such a range that an angle between a reference direction 57 of an operational target player object 56a and a direction of straight line extended from the location of the operational target player object 56a is equal to or less than a predetermined reference angle ($\theta1$), and that a distance (distance in WX-WZ planar system) from the location of the operational target player object 56a falls within a predetermined reference distance (R1). It should be noted that the values of the reference angle ($\theta1$) and the reference distance (R1) are determined based on the value of the field-of-view parameter of the operational target player object 56a. Further, the reference direction 57 of the operational target player object 56a may be set as, for example, a front direction of the body of the operational target player object 56a, or may be set as the front direction (view direction) of the head (face) of the operational target player object 56a.

[Field-of-View Area Judging Unit]

The field-of-view area judging unit 66 is implemented mainly by the microprocessor 14. The field-of-view area judging unit 66 judges whether or not each of the teammate player objects is located within the field-of-view area 80 of the operational target player object. According to the embodiment of the present invention, the judgment is made every predetermined interval ($1/60^{th}$ of a second in embodiment of the present invention).

[First Pass Executing Unit]

The first pass executing unit 70 is implemented mainly by the microprocessor 14. The first pass executing unit 70 includes a pass-partner-search-area setting unit 74 and a pass-partner selecting unit 76.

The pass-partner-search-area setting unit 74 sets a pass-partner search area based on the location of the operational target player object and the direction (specified direction) specified by the pass-direction instructing operation.

Figure 7:
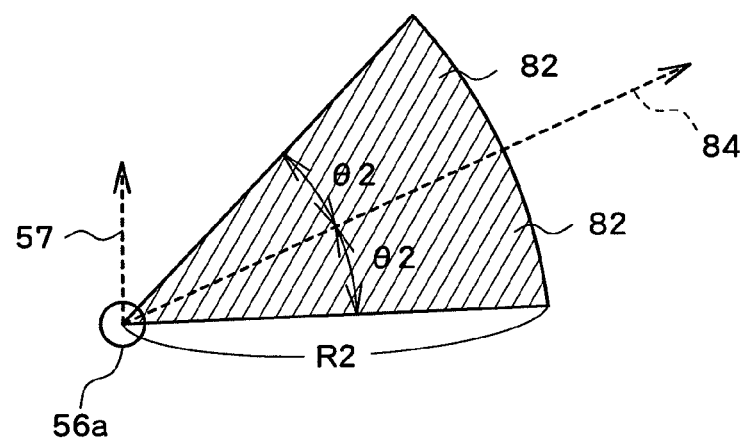
FIG. 7 is a diagram illustrating an example of a pass-partner search area.

FIG. 7 is a diagram for describing the pass-partner search area. As illustrated in FIG. 7, a pass-partner search area 82 is an area covering such a range that an angle between a specified direction 84 and a direction of straight line extended from the location of the operational target player object 56a is equal to or less than a predetermined reference angle ($\theta2$), and that a distance (distance in WX-WZ planar system) from the location of the operational target player object 56a falls within a predetermined reference distance (R2). It should be noted that the values of the reference angle ($\theta2$) and the reference distance (R2) may be determined based on the value of the field-of-view parameter of the operational target player object 56a. Further, according to the embodiment of the present invention, the reference angle ($\theta2$) and the reference distance (R2) are set in such a manner that the pass-partner search area 82 is narrower than the field-of-view area 80. For example, the reference angle ($\theta2$) concerning the pass-partner search area 82 is set to be smaller than the reference angle ($\theta1$) concerning the field-of-view area 80. Further, for example, the reference distance (R2) concerning the pass-partner search area 82 is set to be smaller than the reference distance (R1) concerning the field-of-view area 80.

The pass-partner selecting unit 76 selects, as a pass partner, one of the teammate player objects located within the pass-partner search area 82.

The first pass executing unit 70 moves the ball object 58 in a direction determined based on the location of the teammate player object selected by the pass-partner selecting unit 76. For example, the first pass executing unit 70 moves the ball object 58 in a direction from the location of the operational target player object to the location of the teammate player object selected by the pass-partner selecting unit 76. Alternatively, the first pass executing unit 70 may be configured to predict, based on the location, moving direction, moving speed, and the like of the teammate player object selected by the pass-partner selecting unit 76, a future location of the teammate player object concerned. Then, the first pass executing unit 70 may move the ball object 58 in a direction from the location of the operational target player object to the future location of the teammate player object.

[Second Pass Executing Unit]

The second pass executing unit 72 is implemented mainly by the microprocessor 14. The second pass executing unit 72 moves the ball object 58 in a direction specified by the pass-direction instructing operation that has been received by the pass-instructing-operation receiving unit 62. For example, when a tilt direction of the left operation stick 36 is the direction d illustrated in FIG. 5(a), the second pass executing unit 72 moves the ball object 58 in the direction D in the virtual three-dimensional space 50 illustrated in FIG. 5(b).

In the case where movement control (pass control) of the ball object 58 is performed by the second pass executing unit 72, a pass is delivered in a direction in the virtual three-dimensional space 50, which corresponds to a tilt direction of the left operation stick 36. Accordingly, if the user does not accurately specify the direction of the teammate player object, the teammate player object cannot receive the pass.

On the other hand, in the case where the movement control of the ball object 58 is performed by the first pass executing unit 70, a pass is delivered in a direction determined based on the location of any one of the teammate player objects located within the pass-partner search area 82. Accordingly, if the user specifies the direction of the teammate player object with a certain degree of accuracy, the teammate player object can receive the pass.

[Pass-Execution Control Unit]

The pass-execution control unit 68 is implemented mainly by the microprocessor 14. When the pass-execution instructing operation is received by the pass-instructing-operation receiving unit 62, the pass-execution control unit 68 causes any one of the first pass executing unit 70 and the second pass executing unit 72 to perform the movement control of the ball object 58. The pass-execution control unit 68 selects any one of the first pass executing unit 70 and the second pass executing unit 72 based on the judgment result of the field-of-view area judging unit 66. According to the embodiment of the present invention, the pass-execution control unit 68 selects any one of the first pass executing unit 70 and the second pass executing unit 72 based on the result of the judgment made by the field-of-view area judging unit 66 during a period from a predetermined time (time longer than $\frac{1}{60}^{th}$ of a second: e.g., 3 seconds) before to a current time, with respect to the teammate player object located within the pass-partner search area 82.

For example, in a case where any one of the teammate player objects located within the pass-partner search area 82 is located within the field-of-view area 80 of the operational target player object, the pass-execution control unit 68 causes the first pass executing unit 70 to perform the movement control of the ball object 58. In this case, the first pass executing unit 70 determines the pass direction based on the location of that teammate player object.

Further, for example, in a case where any one of the teammate player objects located within the pass-partner search area 82 was previously located within the field-of-view area 80 of the operational target player object sometime during the period from the predetermined time before to the current time, the pass-execution control unit 68 also causes the first pass executing unit 70 to perform the movement control of the ball object 58. In this case, too, the first pass executing unit 70 determines the pass direction based on the location of that teammate player object.

Further, for example, in a case where none of the teammate player objects located within the pass-partner search area 82 has been located within the field-of-view area 80 of the operational target player object during the period from the predetermined time before to the current time, the pass-execution control unit 68 causes the second pass executing unit 72 to perform the movement control of the ball object 58. It should be noted that in a case where none of the teammate player objects is located within the pass-partner search area 82, the pass-execution control unit 68 also causes the second pass executing unit 72 to perform the movement control of the ball object 58.

As described above, with the game machine 10, with regard to the teammate player object that is currently located within the field-of-view area 80 of the operational target player object or the teammate player object that was previously located within the field-of-view area 80 of the operational target player object sometime during the period from the predetermined time before to the current time, if the direction of the teammate player object is specified with a certain degree of accuracy, the teammate player object can receive the pass. On the other hand, with regard to the teammate player object that has never been located within the field-of-view area 80 of the operational target player object during the period from the predetermined time before to the current time, unless the direction of the teammate player object concerned is accurately specified, the teammate player object concerned cannot receive the pass. In this manner, the game machine 10 is configured to desirably demonstrate the "extent of field-of-view" of a player.

Figure 8:
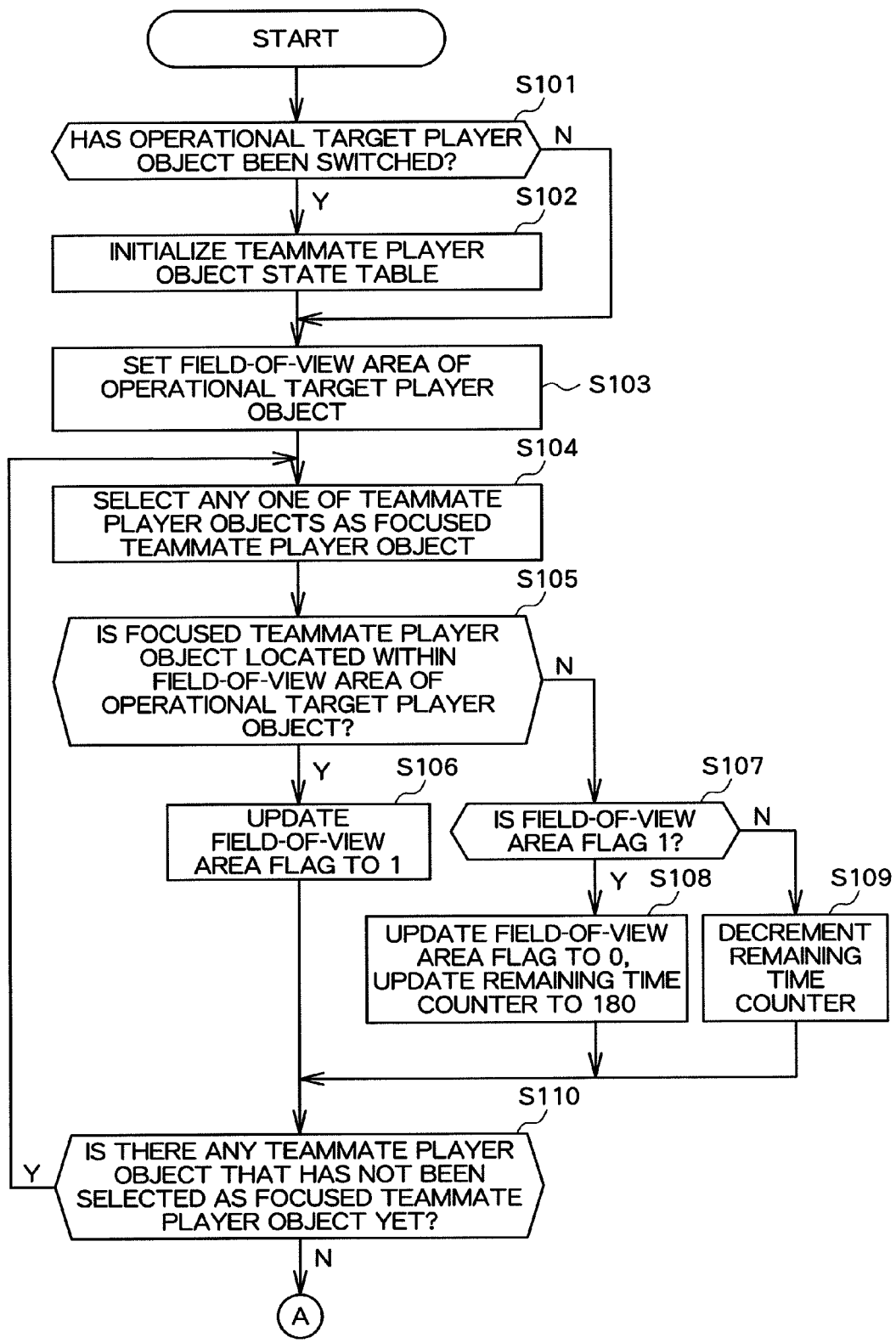
FIG. 8 is a flow chart illustrating processing executed on the game machine.
Figure 9:
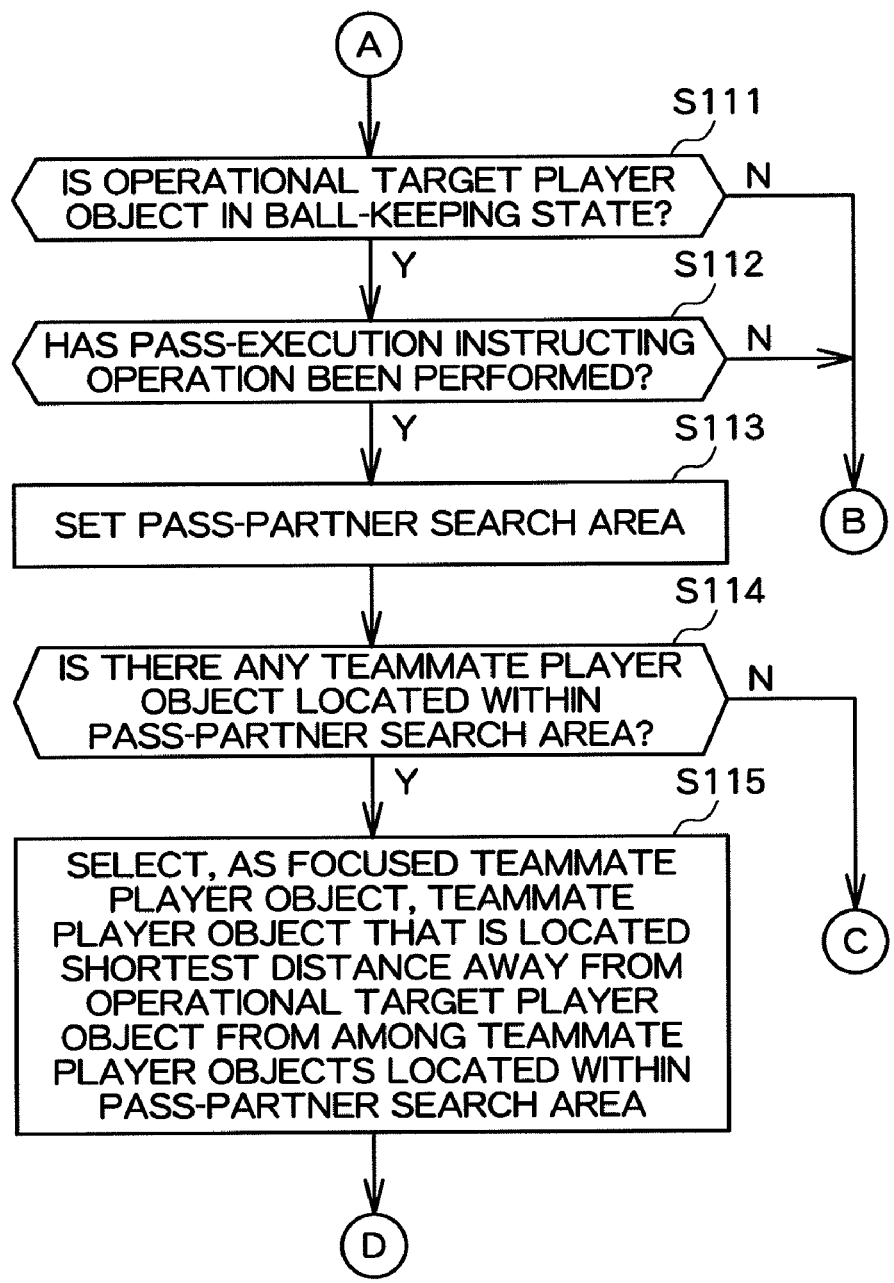
FIG. 9 is a flow chart illustrating the processing executed on the game machine.
Figures 10, 11:
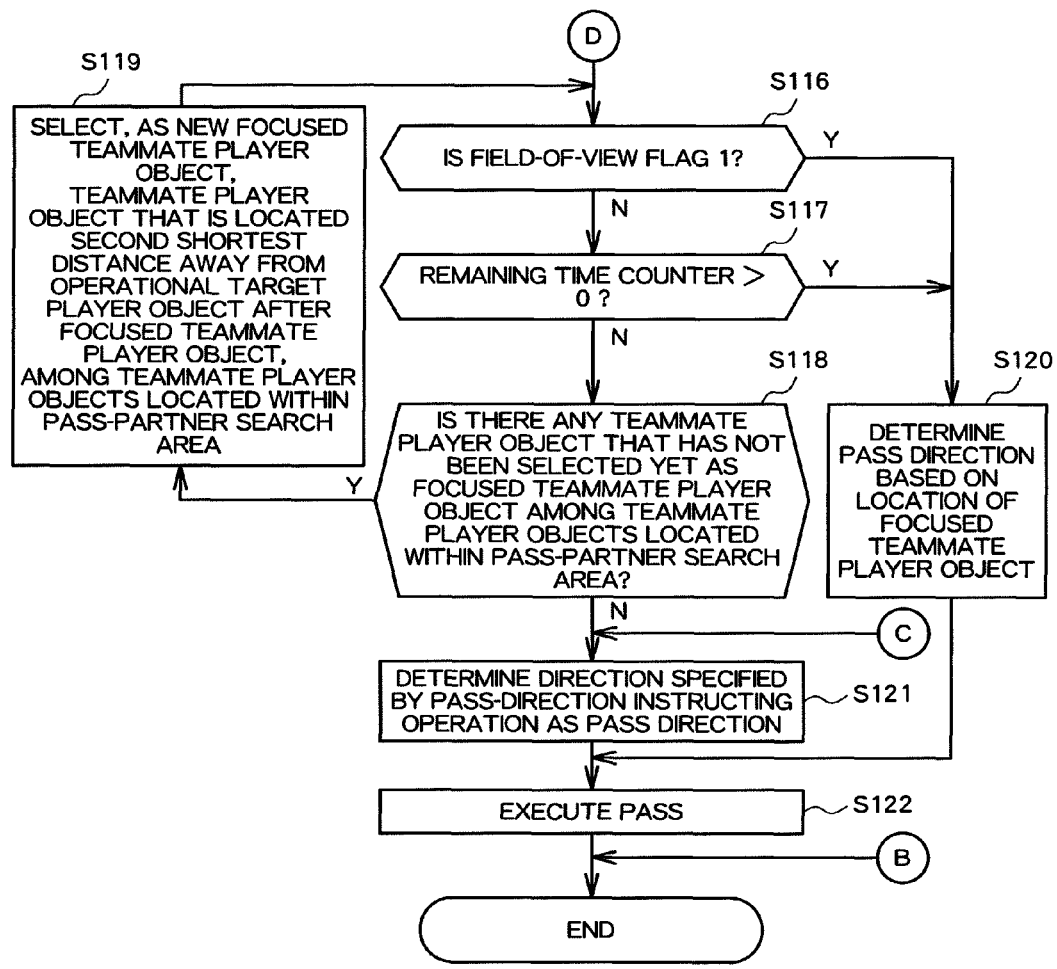
FIG. 10 is a flow chart illustrating the processing executed on the game machine.
FIG. 11 is a diagram illustrating an example of a teammate player object state table.

Next, processing executed on the game machine 10 will be described. FIGS. 8, 9, and 10 are flow charts mainly illustrating processing relating to the present invention among the processing executed on the game machine 10 every predetermined interval ($\frac{1}{60}^{th}$ of a second in the embodiment of the present invention). The game program for causing the microprocessor 14 to execute the processing is read from the DVD-ROM 25, and the processing is then executed by the microprocessor 14, thereby implementing the respective functional blocks illustrated in FIG. 4.

As illustrated in FIG. 8, first, it is judged whether or not the operational target player object has been switched (S101). In a case where the operational target player object has been switched to another player object 56, a teammate player object state table that is stored in the main memory 26 is initialized (S102).

Here, the teammate player object state table will be described. FIG. 11 illustrates an example of the teammate player object state table. As illustrated in FIG. 11, the teammate player object state table includes a "player object ID" field, a "field-of-view area flag" field, and a "remaining time counter" field. In the "player object ID" field, a player object ID for uniquely identifying the player object 56 is stored. The teammate player object state table contains records that are each associated with the individual teammate player objects, and the player object ID of any one of the teammate player objects is stored in the "player object ID" field of each of the records.

In the "field-of-view area flag" field, a flag indicating whether or not the teammate player object is currently located within the field-of-view area 80 of the operational target player object is stored. When the teammate player object is not located within the field-of-view area 80 of the operational target player object, 0 is stored in the "field-of-view area flag" field, whereas when the teammate player object is located within the field-of-view area 80 of the operational target player object, 1 is stored in the "field-of-view area flag" field.

In the "remaining time counter" field, when the teammate player object was previously located within the field-of-view area 80 of the operational target player object, but is not currently located within the field-of-view area 80 of the operational target player object, a numerical value indicating a remaining time before a predetermined time (3 seconds in the embodiment of the present invention) elapses after the teammate player object has ceased being within the field-of-view area 80 of the operational target player object is stored. According to the embodiment of the present invention, a numerical value that indicates the remaining time in units of $\frac{1}{60}^{th}$ of a second is stored. For example, in a case where one second has elapsed since the teammate player object has ceased being within the field-of-view area 80 of the operational target player object, 120 (2 seconds×60) is stored in the "remaining time counter" field.

In S102, the records associated with the respective teammate player objects are generated, and at the same time, the "field-of-view area flag" and "remaining time counter" of each of the teammate player objects are initialized to 0.

When the processing of S102 is completed, or when it is judged in S101 that the operational target player object has not been switched, the field-of-view area 80 of the operational target player object is set (S103). In setting the field-of-view area 80 of the operational target player object, location information and attitude information of the operational target player object, which are stored in the game data storage unit 60, are referenced. After the field-of-view area 80 of the operational target player object is set, information for specifying the field-of-view area 80 of the operational target player object is stored in the main memory 26. This information stored in the main memory 26 is referenced in the processing described below.

Subsequently, any one of the teammate player objects is selected as a focused teammate player object (S104). Then, it is judged whether or not the focused teammate player object is located within the field-of-view area 80 of the operational target player object (S105). In making this judgment, location information of the focused teammate player object stored in the game data storage unit 60 is referenced.

When the focused teammate player object is located within the field-of-view area 80 of the operational target player object, the "field-of-view area flag" of the focused teammate player object is updated to 1 (S106). On the other hand, when the focused teammate player object is not located within the field-of-view area 80 of the operational target player object, it is judged whether or not the "field-of-view area flag" of the focused teammate player object is 1 (S107).

Here, the case where it is judged that the "field-of-view area flag" of the focused teammate player object is 1 indicates a case where the focused teammate player object has changed from being in a state where the focused teammate player object is located within the field-of-view area 80 of the operational target player object to being in a state where the focused teammate player object is not located within the field-of-view area 80 of the operational target player object. In this case, the "field-of-view area flag" of the focused teammate player object is updated to 0, and the "remaining time counter" is updated to 180 (=3 seconds×60) (S108).

On the other hand, the case where it is judged in S107 that the "field-of-view area flag" of the focused teammate player object is 0 indicates a case where a state in which the focused teammate player object is not located within the field-of-view area 80 of the operational target player object is continuing. In this case, the value of the "remaining time counter" of the focused teammate player object is decremented by 1 (S109).

After the processing of S106, S108, or S109 is completed, it is judged whether or not there is any teammate player object that has not been selected as the focused teammate player object (S110). When there is such a teammate player object, the processing from S104 to S110 is executed again. On the other hand, when there is no such teammate player object, that is, when the processing from S104 to S109 has been executed for all the teammate player objects, it is judged whether or not the operational target player object is in the ball-keeping state (S111). In making this judgment, information indicating whether or not the player object 56 is the operational target player object or information indicating whether or not the player object 56 is in the ball-keeping state, which are stored in the game data storage unit 60, are referenced.

When the operational target player object is in the ball-keeping state, it is judged whether or not the pass-execution instructing operation has been performed (S112). In other words, it is judged, based on the operation signal that is input from the controller 32, whether or not the button 38A has been depressed.

When it is judged that the pass-execution instructing operation has been performed, the pass-partner search area 82 is set (S113). In setting the pass-partner search area 82, based on the operation signal that is input from the controller 32, the tilt direction of the left operation stick 36 is judged, enabling the judgment on the pass direction specified by the user. Further, the location information of the operational target player object stored in the game data storage unit 60 is referenced.

After the pass-partner search area 82 is set, it is judged whether or not any one of the teammate player objects is located within the pass-partner search area 82 (S114). In making this judgment, the location information of the teammate player objects stored in the game data storage unit 60 is referenced.

When none of the teammate player objects are located within the pass-partner search area 82, the direction specified by the pass-direction instructing operation is determined as the pass direction (S121). Specifically, based on the operation signal that is input from the controller 32, the tilt direction of the left operation stick 36 is judged, and then, the direction in the virtual three-dimensional space 50 corresponding to that tilt direction is determined as the pass direction (see FIG. 5).

On the other hand, when any one of the teammate player objects is located within the pass-partner search area 82, a teammate player object that is located the shortest distance away from the operational target player object, among the teammate player objects located within the pass-partner search area 82, is selected as the focused teammate player object (S115). Specifically, here, the focused teammate player object is selected in increasing order of distance from the operational target player object from among the teammate player objects located within the pass-partner search area 82 (see S118 and S119).

Then, it is judged whether or not the "field-of-view area flag" of the focused teammate player object is 1 (S116). Here, the case where it is judged that the "field-of-view area flag" of the focused teammate player object is 1 indicates the case where the focused teammate player object is located within the field-of-view area 80 of the operational target player object. In this case, the location information of the focused teammate player object stored in the game data storage unit 60 is referenced, and then, the pass direction is determined based on the location of the focused teammate player object (S120). For example, the direction from the location of the operational target player object to the location of the focused teammate player object is determined as the pass direction. Alternatively, based on the location, moving direction, moving speed, and the like of the focused teammate player object, the future location of the focused teammate player object is predicted. Then, the direction from the location of the operational target player object to the future location of the focused teammate player object is determined as the pass direction.

On the other hand, when it is judged that the "field-of-view area flag" of the focused teammate player object is 0, it is judged whether or not the "remaining time counter" of the focused teammate player object is larger than 0 (S117). It should be noted that the case where it is judged that the "remaining time counter" of the focused teammate player object is larger than 0 indicates a case where the focused teammate player object was previously located within the field-of-view area 80 of the operational target player object, but is not currently located there, and where an elapsed time after the focused teammate player object first became outside the field-of-view area 80 of the operational target player object is less than the predetermined time (3 seconds in embodiment of the present invention). In this case, too, the pass direction is determined based on the location of the focused teammate player object (S120).

On the other hand, when it is judged that the "remaining time counter" of the focused teammate player object is equal to or less than 0, it is judged whether or not a teammate player object that is located the second shortest distance away from the operational target player object, after the focused teammate player object, is present among the teammate player objects located within the pass-partner search area 82 (S118). Then, when there is such a teammate player object, that teammate player object is selected as a new focused teammate player object (S119), and then the processing from S116 is executed again. On the other hand, when there is no such teammate player object, the direction specified by the pass-direction instructing operation is determined as the pass direction (S121).

After the processing of S120 or S121 is executed, the pass is executed by the operational target player object (S122). In other words, moving of the ball object 58 in the direction determined in S120 or S121 is started. Specifically, state information (location information etc.) of the ball object 58, which is stored in the game data storage unit 60, is updated such that the ball object 58 moves in the direction determined in S120 or S121. In addition to that, pass action motion data is read from the DVD-ROM 25, and in accordance with the pass action motion data, attitude control of the operational target player object is started.

As described above, the game machine 10 has such a configuration as to associate the judgment result from the field-of-view area judging unit 66 with selection between the first pass executing unit 70 and the second pass executing unit 72 for performing the movement control of the ball object 58 when the pass-execution instructing operation is performed.

As a result of this, with the game machine 10, for the teammate player object that is currently located within the field-of-view area 80 of the operational target player object or the teammate player object that was previously located within the field-of-view area 80 of the operational target player object sometime during the period from the predetermined time before to the current time, as long as the user specifies the direction of the teammate player object concerned with a certain degree of accuracy, the teammate player object concerned can receive the pass unless the pass is intercepted by an opponent player object. On the other hand, with regard to the teammate player object that has not been located within the field-of-view area 80 of the operational target player object during the period from the predetermined time before to the current time, unless the user accurately specifies the direction of the teammate player object concerned, that teammate player object cannot receive the pass.

In real soccer matches, a player who recognizes locations, movements etc. of their teammate players over a relatively wide area and, for example, delivers an excellent pass to their teammate player, is sometimes referred to as a "player with good vision". In this regard, the game machine 10, which has such a configuration as described above, makes it possible to desirably demonstrate the "extent of field-of-view" of a player in a soccer game.

Further, by causing the first pass executing unit 70 to perform the movement control of the ball object 58 on every occasion when the pass-execution instructing operation is performed, it is possible to consider enhancing the operability of pass operations of the user. In this case, however, an accurate pass is executed even to a teammate player object that is outside the field-of-view of the operational target player object, with the result that the reality may be lost. In this regard, with the game machine 10, it is possible to prevent such a drawback from occurring.

Further, with the game machine 10, not only with regard to the teammate player object that is currently located within the field-of-view area 80 of the operational target player object but also with regard to the teammate player object that was previously located within the field-of-view area 80 of the operational target player object sometime during the period from the predetermined time before to the current time, as long as the user specifies the direction of the teammate player object concerned with a certain degree of accuracy, the teammate player object concerned can receive the pass. With the game machine 10, it is possible to desirably demonstrate a situation where, when a player has caught sight of a teammate player, the player remembers that teammate player for a certain period of time.

Further, with the game machine 10, the size of the field-of-view area 80 of the operational target player object varies depending on the field-of-view parameter of the operational target player object. With this configuration, the game machine 10 desirably demonstrates a situation where the "extent of field-of-view" varies depending on the individual players.

It should be noted that the present invention is not limited to the embodiment described above.

For example, the processing of S117 illustrated in FIG. 10 may be eliminated. In this manner, such a configuration may be made that when the direction of the teammate player object is specified with a certain degree of accuracy, only the teammate player object that is currently located within the field-of-view area 80 of the operational target player object can receive the pass.

Further, for example, in S108 of FIG. 8, the numerical value stored in the "remaining time counter" may be configured to change in accordance with the field-of-view parameter of the operational target player object. As described above, according to the embodiment of the present invention, such a situation where, when a player catches sight of a teammate player, the player remembers that teammate player for a certain period, is desirably demonstrated. With the configuration described above, it is further possible to desirably demonstrate a situation where a memory duration varies from player to player.

Further, for example, the opponent team may be operated by another user. Still further, for example, the operational target team or the opponent team may be operated by a plurality of users.

Further, for example, the game executed on the game machine 10 is not limited to a soccer game. The present invention may be applied to a sports game such as basketball or ice hockey that is played using a moving object such as a ball or a puck.

Figure 12:
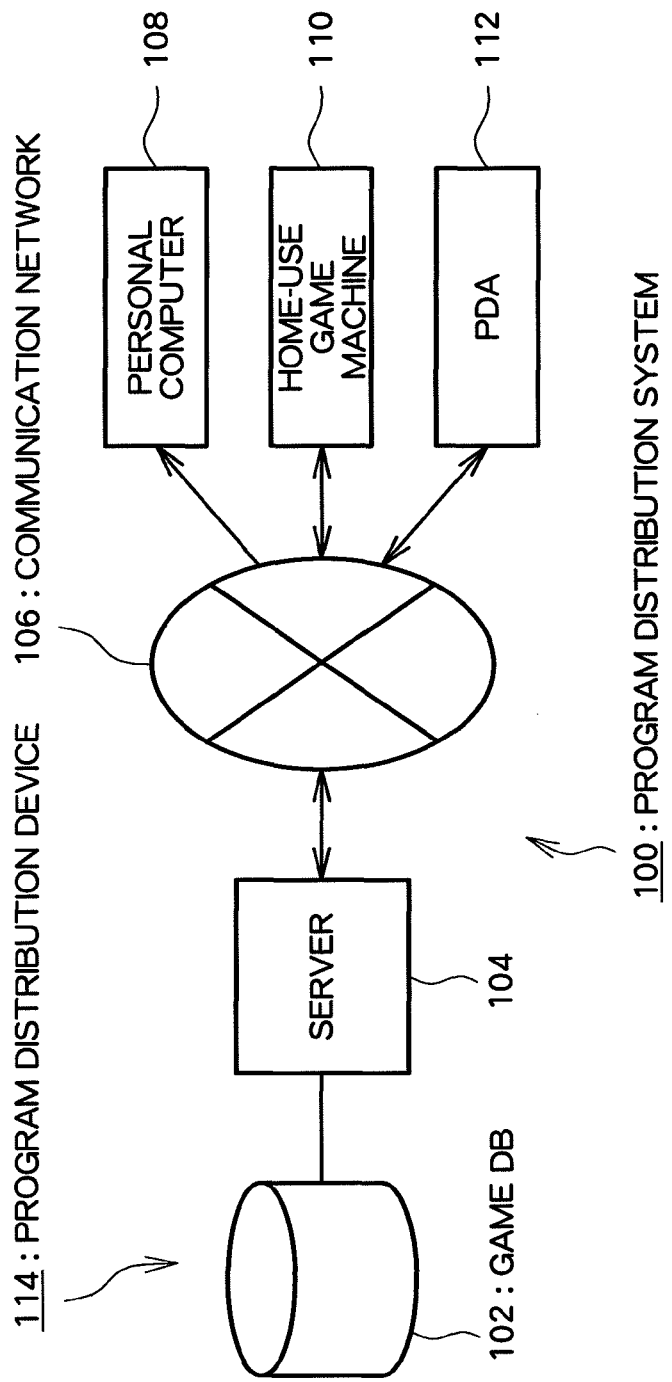
FIG. 12 is a diagram illustrating an overall configuration of a program distribution system according to another embodiment of the present invention.

Further, for example, in the description given above, the program is supplied to the home-use game machine 11 from the DVD-ROM 25 serving as an information storage medium, and may also be distributed to homes and the like via a communication network. FIG. 12 is a diagram illustrating an overall configuration of a program distribution system using a communication network. A program distribution method according to the present invention will be described with reference to FIG. 12. As illustrated in FIG. 12, a program distribution system 100 includes a game database 102, a server 104, a communication network 106, a personal computer 108, a home-use game machine 110, and a personal digital assistant (PDA) 112. A program distribution device 114 is constructed of the game database 102 and the server 104 among those components. The communication network 106 includes, for example, the Internet and a cable TV network. In this system, the game database (information storage medium) 102 is stored with programs having the same storage contents as those of the DVD-ROM 25. A consumer makes a game distribution request by use of the personal computer 108, the home-use game machine 110, the PDA 112, or the like, whereby the request is transferred to the server 104 via the communication network 106. The server 104 then reads the program from the game database 102 in response to the game distribution request, and transmits the program to the game distribution requester such as the personal computer 108, the home-use game machine 110, the PDA 112, etc. Herein, the game is distributed in response to the game distribution request. However, the server 104 may transmit the game in a one-sided manner. Further, it is not always necessary for the whole program required for actualizing the game to be distributed at one time (batch distribution), and necessary program modules may be distributed (segmented distribution) in association with a stage of the game. In this manner, through distributing the game via the communication network 106, the consumer can easily obtain the program.

The invention claimed is:

1. A game machine, which displays a situation of a game space in which an operational target player character, one or more teammate player characters, and a moving object character representing a moving object are located, and which provides a sports game played using the moving object between an operational target team, to which the operational target player character and the one or more teammate player characters belong, and an opponent team, comprising:
    field-of-view area setting means for setting, based on a location and orientation of the operational target player character, a field-of-view area of the operational target player character;
    field-of-view area judging means for judging whether or not one or more teammate player characters are located within the field-of-view area of the operational target player character;
    pass-instructing-operation receiving means for receiving a pass-execution instructing operation that gives an instruction to execute a pass and a pass-direction instructing operation that specifies a pass direction in the game space;
    pass-partner-search-area setting means for setting a pass-partner search area, based on the location of the operational target player character and a direction specified by the pass-direction instructing operation;
    pass-partner selecting means for selecting any one of the teammate player characters located within the pass-partner search area as a pass partner;
    first pass executing means for moving the moving object character in a direction determined based on a location of the teammate player character selected by the pass-partner selecting means;
    second pass executing means for moving the moving object character in a direction specified by the pass-direction instructing operation; and
    pass-execution control means for, in the case where the pass-execution instructing operation is received, causing any one of the first pass executing means and the second pass executing means to perform movement control of the moving object character, the pass-execution control means selecting the anyone of the first pass executing means and the second pass executing means based on a judgment result from the field-of-view area judging means.

2. A game machine according to claim 1, wherein the pass-execution control means selects, based on a result of the judgment made by the field-of-view area judging means during a period from a predetermined time before to a current time, the any one of the first pass executing means and the second pass executing means.

3. A computer-readable information storage medium recorded with a program for causing a computer to function as a game machine which displays a situation of a game space in which an operational target player character, one or more teammate player characters, and a moving object character representing a moving object are located, and which provides a sports game played using the moving object between an operational target team, to which the operational target player character and the one or more teammate player characters belong, and an opponent team,
    the program further causing the computer to function as:
        field-of-view area setting means for setting, based on a location and orientation of the operational target player character, a field-of-view area of the operational target player character;
        field-of-view area judging means for judging whether or not one or more teammate player characters are located within the field-of-view area of the operational target player character;
        pass-instructing-operation receiving means for receiving a pass-execution instructing operation that gives an instruction to execute a pass and a pass-direction instructing operation that specifies a pass direction in the game space;
        pass-partner-search-area setting means for setting a pass-partner search area, based on the location of the operational target player character and a direction specified by the pass-direction instructing operation;
        pass-partner selecting means for selecting any one of the teammate player characters located within the pass-partner search area as a pass partner;
        first pass executing means for moving the moving object character in a direction determined based on a location of the teammate player character selected by the pass-partner selecting means;
        second pass executing means for moving the moving object character in a direction specified by the pass-direction instructing operation; and
        pass-execution control means for, in the case where the pass-execution instructing operation is received, causing any one of the first pass executing means and the second pass executing means to perform movement control of the moving object character, the pass-execution control means selecting the any one of the first pass executing means and the second pass executing means based on a judgment result from the field-of-view area judging means.

* * * * *